United States Patent [19]

Maeda et al.

[11] 4,395,617
[45] Jul. 26, 1983

[54] SUCCESSIVELY JOINABLE CARBON ELECTRODE FOR GOUGING METALS

[75] Inventors: Masanori Maeda, Katano; Koji Ishihara; Yoshio Kino, both of Hirakata, all of Japan

[73] Assignee: Matsushita Electric Industrial Co., Ltd., Osaka, Japan

[21] Appl. No.: 255,264

[22] Filed: Apr. 17, 1981

[30] Foreign Application Priority Data

Apr. 18, 1980 [JP] Japan .................................. 55-53833

[51] Int. Cl.³ ............................................ B23K 35/04
[52] U.S. Cl. .................................. 219/145.1; 219/70; 219/145.21; 313/357
[58] Field of Search ................... 219/70, 145.1, 145.21; 313/355, 357

[56] References Cited

U.S. PATENT DOCUMENTS

| | | | |
|---|---|---|---|
| 2,024,445 | 12/1935 | Galehouse | 219/145.1 X |
| 2,527,294 | 10/1950 | Bailey | 313/357 X |
| 2,795,440 | 6/1957 | Holycross | 313/357 |
| 3,030,544 | 4/1962 | Zamboldi et al. | 219/70 X |
| 3,633,063 | 1/1972 | Ando | 219/145.21 X |
| 3,796,853 | 3/1974 | Matsuo | 219/145.21 |

FOREIGN PATENT DOCUMENTS 8781 of 1884 United Kingdom ................ 313/357

Primary Examiner—R. R. Kucia
Attorney, Agent, or Firm—Wenderoth, Lind & Ponack

[57] ABSTRACT

A successively joinable carbon electrode for use in gouging or blasting metallic articles comprises a copper coated electrode body having one end formed into a coaxial connecting projection and the other end formed with a coaxial tapered socket for receiving the connecting projection of another carbon electrode of identical construction. The connecting projection consists of a tapered stem portion adjacent the electrode body and a cylindrical portion on one side of the stem portion opposite to the electrode body such that the projection of one carbon electrode can tightly be fitted into the socket of another carbon electrode with the copper layer on such one carbon electrode electrically connected to the copper layer on such another carbon electrode.

5 Claims, 6 Drawing Figures

SUCCESSIVELY JOINABLE CARBON ELECTRODE FOR GOUGING METALS

BACKGROUND OF THE INVENTION

The present invention relates generally to a slender carbon electrode and, more particularly, to a successively joinable carbon electrode utilizable for gouging or blasting metallic articles.

Various types of successively joinable carbon electrodes utilizable for gouging or blasting steel or other metallic articles are currently available in the commercial market. However, all of them still leave much room for improvement as will be discussed later. As is well understood by those skilled in the art, the essential requirement the joinable carbon electrode must satisfy is that, when one carbon electrode is coaxially connected with another, both the physical connection and the electrical connection must be firmly established simultaneously at the joint therebetween. If the electrical connection at the joint between one carbon electrode and another is unsatisfactory, the electrode assembly or torch composed of coaxially connected carbon electrodes would not withstand the applied electrical current of 500 to 1,500 amperes, resulting in heating of the joint until it becomes red hot. Once this happens, a portion of the connected carbon electrode at the joint become oxidized, resulting in consumption of that portion of the electrodes at the joint and then resulting in breakage of the carbon electrode torch. On the other hand, if the physical connection at the joint is unsatisfactory, there is a possibility of accidental separation of one carbon electrode from another, resulting not only in a potential hazard to one or more attendant workers, but also in an uneconomical way of use of the carbon electrodes.

So far as the carbon electrodes of the type now under discussion are currently manufactured on a mass-production basis, much difficulty has been found in satisfying both the firm physical connection and the firm electrical connection between one carbon electrode and another. In other words, because of the presence of deviations in dimensions among carbon electrodes having been ground during the manufacture thereof and because of the presence of deviations in film thickness of copper layers having been applied on the carbon electrodes, either the physical connection or the electrical connection between one carbon electrode and another tends to fail.

In order to ensure both firm physical and electrical connections at the junction between the carbon electrodes, various methods have heretofore been employed. One method is to employ a tubular copper coupling for each joint. Another method is to knurl a projection of the carbon electrode to be inserted into a socket in another carbon electrode so that a series of small ridges or protuberances on that projection of the carbon electrode can be crushed upon insertion into the socket in such another carbon electrode. A still another method is to form a split in the socket so that the latter can be spread during the insertion of the projection thereinto to absorb a difference in dimensions between the socket in one carbon electrode and the projection in another carbon electrode.

Since the present invention pertains to the carbon electrode of the type using the split described above, the prior art carbon electrode of the same type will be now described in detail with particular reference to FIGS. 1 to 4 of the accompanying drawings.

Referring first to FIG. 1, the prior art carbon electrode comprises an elongated body 1 of circular cross-section made of carbon and having a copper layer 2 coated on the outer peripheral surface thereof. The carbon body 1 has one end integrally formed coaxially with an outwardly tapered connecting projection 3, only a portion of the connecting projection 3 adjacent the carbon body 1 being exteriorly coated with a copper layer 4 which is continuous to the copper layer 2 on the carbon body 1. In practice, this connecting projection 3 is formed by grinding one end of the carbon body 1. The other end of the carbon body 1 is formed into a socket 5 adapted to receive the connecting projection of another carbon electrode of a construction identical with that shown, said socket 5 comprising an inwardly tapered bore portion 6 and a cylindrical opening portion 7 which is coated interiorly with a copper layer 8 continuous to the copper layer 2 on the body 1. The carbon body 1 has a slit 9 therein and extending axially inwardly from said other end of the carbon body, the length of which is larger than the depth of the socket 5, said slit 9 being partially cut throughout the wall of the carbon body 1 defining the socket 5.

When the carbon electrodes of identical construction as shown in FIG. 1 are connected together with the connecting projection 3 of one of them inserted into the socket 5 of the other of them in a manner shown in FIG. 2, both of the physical and electrical connections between these carbon electrodes can be established firmly and satisfactorily. In this condition shown in FIG. 2, not only is the connecting projection 3 depicted as firmly fitted into the socket 5, but the copper layer 4 on the connecting projection 3 is depicted as electrically connected to the copper layer 8 inside the cylindrical portion 7 of the socket 5, thereby satisfying the previously described requirement. Accordingly, only when the carbon electrodes are connected together in the fashion shown in FIG. 2, is there neither a possibility of occurrence of a red hot state at the joint during use nor a possible accidental separation of the carbon electrodes from each other and the resultant electrode torch can exhibit a satisfactory performance. This is primarily because of the function of the slit 9. The function of said slit 9 is, however, limited and it often happens that the carbon electrodes are connected together in a fashion shown in either FIG. 3 or FIG. 4.

The condition shown in FIG. 3 occurs either where the diameter of the connecting projection 3 of one carbon electrode is larger than that of the socket 5 of another carbon electrode, or where the copper layers 4 and 8 have an insufficient film thickness. In this case, when the projection 3 of such one carbon electrode is inserted into the socket 5 in such another carbon electrode, the split 9 is spread axially laterally of the carbon body 1, consequently expanding the copper layer 8 in the socket 5 radially outwardly to such an extent that the copper layer 4 on the connecting projection 3 being inserted into the socket 5 can no longer electrically connect to the copper layer 8 in the socket 5. This in turn results in the occurrence of the red hot state at the joint of the electrode torch.

On the other hand, the condition shown in FIG. 4 occurs either where the diameter of the connecting projection 3 of one carbon electrode is smaller than that of the socket 5 of another carbon electrode, or where the copper layers 4 and 8 have an excessive film thickness. In this case, insertion of the projection 3 into the socket 5 does not bring about a satisfactory carbon-to-carbon contact between the carbon electrodes so connected together and, accordingly, the carbon electrodes so connected tend to separate from each other during use.

The occurrence of both of the conditions shown in FIGS. 3 and 4 is attributable to the fact that the connecting projection 3 and the socket 5 are tapered in a complementary relationship to each other. More specifically, the reason for the occurrence of the condition of FIG. 3 is that, when the connecting projection 3 of one carbon electrode is inserted into the socket 5 of another carbon electrode, the socket 5 is generally radially outwardly enlarged with the consequent radially outward enlargement of the copper layer 8. On the other hand, the reason for the occurrence of the condition of FIG. 4 is that, since both the connecting projection 3 and the socket 5 are tapered, and since the stroke over which the projection 3 is moved during insertion thereof into the socket 5 is limited, no carbon-to-carbon contact is attained between the carbon electrodes.

The above description concerning the prior art carbon electrode shown in FIGS. 1 to 4 applies to what is disclosed in, for example, the Japanese Utility Model Publication published on Mar. 24, 1980, Japanese Laid-open Utility Model Publication No. 47-33019 which was laid open to public inspection in 1972 and U.S. Pat. No. 3,633,063 which was patented on Jan. 4, 1972.

SUMMARY OF THE INVENTION

Accordingly, the present invention has been developed with a view to substantially eliminating the disadvantages and inconveniences inherent in the prior art carbon electrode discussed hereinbefore and is intended to provide an improved slender carbon electrode which can assuredly and firmly be connected with another carbon electrode of identical construction to provide a carbon electrode torch for use in gouging or blasting metallic articles.

Another object of the present invention is to provide an improved slender carbon electrode of the type referred to above, which can be manufactured on a mass-production basis with no substantial increase in manufacturing cost.

To this end, the present invention provides an improved slender carbon electrode wherein the connecting projection comprises an outwardly tapered stem portion adjacent the elongated carbon body and a cylindrical portion continuous to and protruding coaxially outwardly from the carbon body while the socket is axially inwardly tapered.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF EMBODIMENT

Figure 1:
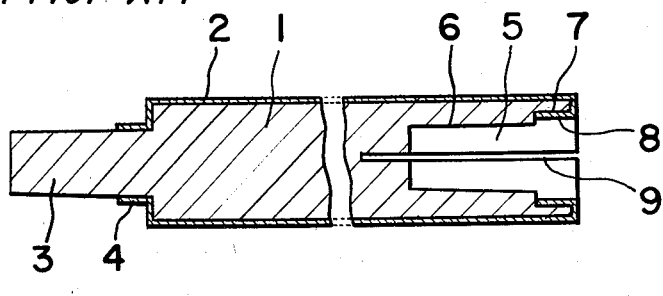
FIG. 1 is a longitudinal sectional view of the prior art carbon electrode.
Figure 2:
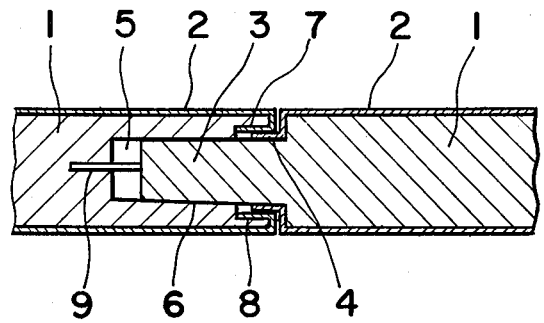
FIGS. 2 to 4 are longitudinal sectional views showing different conditions in which the prior art carbon electrodes of FIG. 1 are connected together, respectively.
Figure 3:
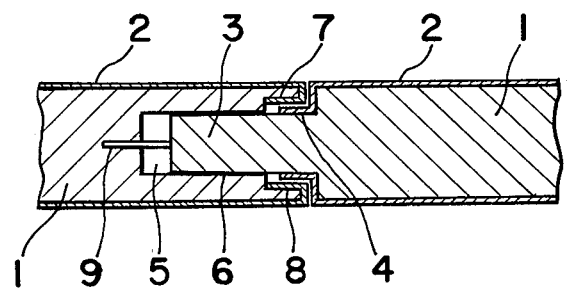
Figure 4:
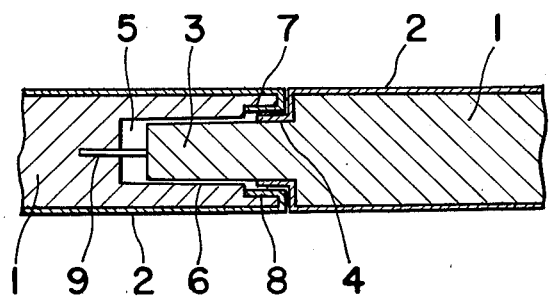
Figure 5:
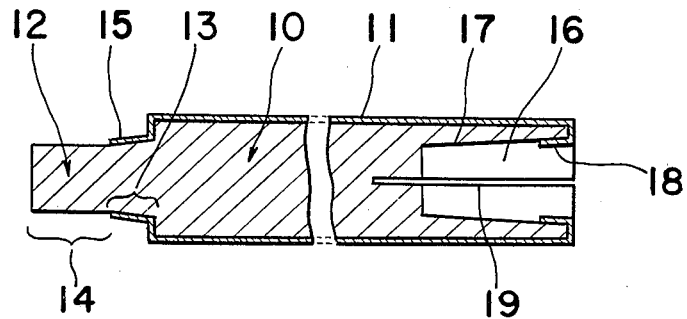
FIG. 5 is a longitudinal sectional view of a carbon electrode embodying the present invention.

Referring now to FIG. 5, a slender carbon electrode embodying the present invention comprises an elongated cylindrical body 10 having one end formed into a connecting projection 12 protruding coaxially outwardly therefrom, and a socket 16 defined therein and extending coaxially inwardly from the other end of the body 10. Preferably, the length of the connecting projection 12 is within the range of 1.1 to 1.8 times the outer diameter of the body 10 while the depth or axial length of the socket 16 is within the range of 1.1 to 1.3 times the length of the projection 12.

As is the case with the prior art carbon electrode, the projection 12 is formed by grinding one end of the body 10 while the socket 16 is formed by boring the other end of the body 10.

The connecting projection 12 consists of a stem portion 13 situated adjacent the body 10 and tapered outwardly so as to converge at a point on one side of said stem portion 13 opposite to the body 10, and a cylindrical portion 14 continuous to and extending coaxially outwardly from the stem portion 13. The stem portion 13 has a maximum diameter adjacent the body 10, which is preferably within the range of 0.5 to 0.9 times the outer diameter of the body 10, and an axial length preferably within the range of 30 to 80% of the length of the projection 12. This stem portion 13 is tapered preferably at an angle within the range of 2° to 5°.

On the other hand, the cylindrical portion 14 has a diameter preferably within the range of 0.4 to 0.8 times the outer diameter of the body 10 and a length preferably within the range of 20 to 70% of the length of the projection 12.

From the foregoing, it will readily be seen that the diameter of the stem portion 13 gradually decreases from its maximum value to a value equal to the diameter of the cylindrical portion 14.

The socket 16 is tapered at an angle smaller than the angle of tapering of the stem portion 13 and preferably within the range of 1° to 3° in a direction coaxially inwardly of the body 10 and has a depth or length preferably within the range of 1.1 to 1.3 times the length of the projection 12.

The stem portion 13 is coated on its outer peripheral surface with a copper layer 15 which is continuous to a copper layer 11 coated on the outer peripheral surface of the body 10. In addition, only an annular portion of the wall 17 of the socket 16 adjacent the opening thereof is coated with a copper layer 18 which is also continuous to the copper layer 11 on the body 10.

The carbon electrode shown in FIG. 5 has a split 19 lying in a plane containing the longitudinal axis of the body 10 and extending axially inwardly from the other end of the body 10 a distance preferably within the range of 1.0 to 1.8 times the depth of the socket 16.

Figure 6:
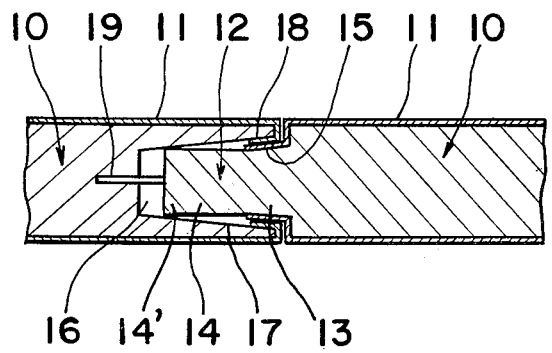
FIG. 6 is a longitudinal sectional view, showing a connection between the carbon electrodes of the construction shown in FIG. 5.

FIG. 6 illustrates a condition wherein the carbon electrodes of identical construction shown in FIG. 5 are coaxially connected together. Referring to FIG. 6, it will readily be seen that the free end 14' of the cylindrical portion 14 of the connecting projection 12 of one carbon electrode is substantially wedged into the socket 16 of another carbon electrode, thereby firmly contacting the wall 17 of the socket 16. At the same time, the copper layer 15 on the stem portion 13 of such one carbon electrode is firmly held in contact with the copper layer 18 on the wall 17 of the socket 16 of such another carbon electrode, thereby establishing a firm electrical connection between the carbon electrodes. Accordingly, the possibility of excessive heating at the joint between the carbon electrodes and any possible accidental separation of one carbon electrode from another can substantially be eliminated.

In essence, the present invention is featured in the provision of the cylindrical portion 14 of the connecting projection 12. In other words, since the cylindrical portion 14 has a diameter larger than the diameter of a portion of the wall 17 the socket 16 where the peripheral edge at the free end of the cylindrical portion 15 contacts when the projection 12 is inserted into the socket 16, either that portion of the wall 17 is scraped in contact with the free end of the projection 12, or the free end of the projection 12 is scraped in contact with that portion of the wall 17, as the projection 12 is inserted into the socket 16. Accordingly, the projection 12 of one carbon electrode can tightly be fitted into the socket 16 of another carbon electrode without radially outwardly enlarging the split 19 and, at the same time, a good electrical connection between the carbon electrodes can be established with the copper layer 15 held firmly in contact with the copper layer 18. Moreover, because of the feature described above, the carbon electrode embodying the present invention has a relatively large tolerance, as compared with that of the prior art carbon electrode, and therefore it does not have to be manufactured to a great precision in dimensions such as is required in the case of a prior art carbon electrode.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention unless they depart therefrom.

What is claimed is:

1. A successively joinable carbon electrode for gouging metallic articles, which comprises:
    an elongated electrode body coated on its outer periphery with a copper layer;
    a connecting projection formed at and integral with one end of the electrode body and protruding coaxially outwardly therefrom, said projection consisting of a continuous combination of a frustoconical stem portion adjacent and continuous to the electrode body and a cylindrical portion continuous to and on one side of the stem portion opposite to the electrode body, said stem portion being coated on its periphery with a copper layer which is continuous to the copper layer on the electrode body;
    said electrode body having a socket defined therein and extending from the other end thereof in a direction coaxially inwardly thereof in a tapered fashion, a wall defining the socket having an annular portion adjacent the opening of said socket coated with a copper layer which is continuous to the copper layer on the electrode body; and
    said electrode body also having a split cut from said other end of the electrode body in a direction inwardly thereof over a distance larger than the depth of the socket whereby, when the carbon electrodes of identical construction are coaxially connected together with the connecting projection of one carbon electrode inserted into the socket of the other carbon electrode, the free end of the projection tightly contacts the wall defining the socket and the copper layer on the stem portion contacts the copper layer on said annular portion of the wall defining the socket.

2. A carbon electrode as claimed in claim 1, wherein the connecting projection has a length within the range of 1.1 to 1.8 times the outer diameter of the electrode body, and said socket has a depth within the range of 1.1 to 1.3 times the length of the connecting projection, and wherein said split extends over the distance substantially within the range of 1.0 to 1.8 times the depth of the socket.

3. A successively joinable carbon electrode for gouging metallic articles, which comprises:
    an elongated electrode body coated on its outer periphery with a copper layer;
    a connecting projection formed at and integral with one end of the electrode body and protruding coaxially outwardly therefrom, said projection consisting of a continuous combination of a frustoconical stem portion adjacent and continuous to the electrode body and a cylindrical portion continuous to and on one side of the stem portion opposite to the electrode body, said stem portion being coated on its periphery with a copper layer which is continuous to the copper layer on the electrode body;
    said electrode body having a socket defined therein and extending from the other end thereof in a direction coaxially inwardly thereof in a tapered fashion, a wall defining the socket having an annular portion adjacent the opening of said socket coated with a copper layer which is continuous to the copper layer on the electrode body; and
    said electrode body also having a split cut from said other end of the electrode body in a direction inwardly thereof over a distance larger than the depth of the socket whereby, when the carbon electrodes of identical construction are coaxially connected together with the connecting projection of one carbon electrode inserted into the socket of the other carbon electrode, the free end of the projection contacts the wall defining the socket and the copper layer on the stem portion contacts the copper layer on said annular portion of the wall defining the socket;
    wherein the stem portion has its maximum diameter within the range of 0.5 to 0.9 times the outer diameter of the electrode body and a length within the range of 30 to 80% of the length of the connecting projection, and said cylindrical portion has a diameter within the range of 0.4 to 0.8 times the outer diameter of the electrode body and a length within the range of 20 to 70% of the length of the connecting projection.

4. A successively joinable carbon electrode for gouging metallic articles, which comprises:
    an elongated electrode body coated on its outer periphery with a copper layer;
    a connecting projection formed at and integral with one end of the electrode body and protruding coaxially outwardly therefrom, said projection consisting of a continuous combination of a frustoconical stem portion adjacent and continuous to the electrode body and a cylindrical portion continuous to and on one side of the stem portion opposite to the electrode body, said stem portion being coated on its periphery with a copper layer which is continuous to the copper layer on the electrode body;

said electrode body having a socket defined therein and extending from the other end thereof in a direction coaxially inwardly thereof in a tapered fashion, a wall defining the socket having an annular portion adjacent the opening of said socket coated with a copper layer which is continuous to the copper layer on the electrode body; and said electrode body also having a split cut from said other end of the electrode body in a direction inwardly thereof over a distance larger than the depth of the socket whereby, when the carbon electrodes of identical construction are coaxially connected together with the connecting projection of one carbon electrode inserted into the socket of the other carbon electrode, the free end of the projection contacts the wall defining the socket and the copper layer on the stem portion contacts the copper layer on said annular portion of the wall defining the socket;

wherein the connecting projection has a length within the range of 1.1 to 1.8 times the outer diameter of the electrode body, and said socket has a depth within the range of 1.1 to 1.3 times the length of the connecting projection, and wherein said split extends over the distance substantially within the range of 1.0 to 1.8 times the depth of the socket;

and wherein the stem portion has its maximum diameter within the range of 0.5 to 0.9 times the outer diameter of the electrode body and a length within the range of 30 to 80% of the length of the connecting projection, and said cylindrical portion has a diameter within the range of 0.4 to 0.8 times the outer diameter of the electrode body and a length within the range of 20 to 70% of the length of the connecting projection.

5. A carbon electrode as claimed in claims 3 or 4, wherein the stem portion is tapered outwardly of the electrode body at an angle within the range of 2 to 5 degrees and the socket is tapered inwardly of the electrode body at an angle within the range of 1 to 3 degrees, and wherein the tapering angle of the socket is smaller than that of the stem portion.

* * * * *